(12) United States Patent
Verma et al.

(10) Patent No.: US 7,292,383 B2
(45) Date of Patent: Nov. 6, 2007

(54) CONTAINED RESONANT CAVITY AND SYSTEMS INCORPORATING SAME

(76) Inventors: Ravi Verma, 2465 Casa Grande St., Pasadena, CA (US) 91106; Massimo A. Sivilotti, 1211 Via Granate, Sierra Madre, CA (US) 91024; Michael Emerling, 917 Palm St., South Pasadena, CA (US) 91030

(*) Notice: Subject to any disclaimer, the term of this patent is extended or adjusted under 35 U.S.C. 154(b) by 93 days.

(21) Appl. No.: 10/960,392

(22) Filed: Oct. 7, 2004

(65) Prior Publication Data

US 2005/0073734 A1    Apr. 7, 2005

Related U.S. Application Data

(60) Provisional application No. 60/481,478, filed on Oct. 7, 2003.

(51) Int. Cl.
  *G02F 1/03* (2006.01)
  *G01B 9/02* (2006.01)
(52) U.S. Cl. .................... 359/261; 356/519
(58) Field of Classification Search ........ 359/247, 359/259–261, 302; 356/454, 506, 519
  See application file for complete search history.

(56) References Cited

U.S. PATENT DOCUMENTS 3,316,501 A * 4/1967 Giordmaine et al. .......... 372/92

2005/0056787 A1 * 3/2005 Cong et al. .................. 250/343

* cited by examiner

*Primary Examiner*—Ricky Mack
*Assistant Examiner*—William Choi

(57) ABSTRACT

A contained resonant cavity. The contained resonant cavity includes a first surface and a second surface that are partially transmissive and partially reflective, One or more reflective sidewall, are positioned between the first surface and the second surface. In a specific embodiment, the first surface and the second surface are substantially parallel and represent input and output surfaces, respectively, of the contained resonant cavity. The one or more sidewalls are approximately perpendicular to the first surface and the second surface and include a first sidewall having a first substantially reflective planar surface that faces a second substantially reflective planar surface of the second sidewall. A third sidewall and a fourth sidewall have fourth and fifth substantially reflective Lacing sidewalls, respectively. In an illustrative embodiment, the one or more sidewalls include plural reflective sidewall, arranged perpendicularly between the first surface and the second surface to form an array of contained resonant cavities therebetween. The ray of contained resonant cavities is readily employed in various applications including unique tunable optical filter rays, lens-less imaging systems, and multispectral imaging systems.

11 Claims, 6 Drawing Sheets

CONTAINED RESONANT CAVITY AND SYSTEMS INCORPORATING SAME

CLAIM OF PRIORITY

This application claims priority from U.S. Provisional Patent Application Ser. No. 60/481478, filed Oct. 7, 2003, entitled TUNABLE OPTICAL FILTER ARRAYS, ENHANCED HYPERSPECTRAL FOCAL PLANE ARRAYS, LENS-LESS IMAGING SYSTEMS AND OTHER DEVICES BASED ON CONTAINED RESONANT CAVITIES, which is incorporated by reference herein.

ACKNOWLEDGEMENT OF GOVERNMENT SUPPORT

This invention was made with Government support under Contract No.s: DASG6003-P-0056, DASG60-03-P-0059, and NAS1-03032 awarded by the United States Department of Defense Small Business Innovation Research (SBIR) Program. The Government may have certain rights to this invention.

BACKGROUND OF THE INVENTION

1. Field of Invention

This invention relates to cavities for manipulating electromagnetic energy. Specifically, the present invention relates to resonant cavities and accompanying systems.

2. Description of the Related Art

Resonant cavities are employed in various demanding applications including lasers and optical filters. Such applications demand compact cost-effective resonant cavities that exhibit minimal optical losses.

Conventionally, resonant cavities are implemented via Fabry-Perot etalons, which are resonant cavities formed between two parallel facing partially reflective mirrors. Light is typically input perpendicularly through the backside of one mirror. Light resonating between the mirrors may exit the etalon through the front side of the opposing mirror.

To achieve a desired transmission profile with very narrow peaks and minimal losses, these so-called Fabry-Perot resonant cavities require highly reflective smooth parallel mirrors with low absorption coefficients. Otherwise, power loss due to the walk-off effect and absorption may be problematic. The walk-off effect occurs when mirror misalignments or surface defects cause electromagnetic energy oscillating between the mirrors to exit through sides of the resonant cavities.

Stringent requirements for Fabry-Perot etalons increase the price and design complexity of systems employing the etalons. For example, tunable optical filters may employ Fabry-Perot etalons, which are strategically angled relative to input electromagnetic energy to alter etalon output spectral characteristics. Unfortunately, the walk-off effect causes such filters to be prohibitively lossy for many applications. Furthermore, Fabry-Perot etalons typically exhibit resonance at discrete wavelengths only, which limits applicability of the etalons.

Hence, a need exists in the art for an efficient resonant cavity that mitigates parallelism, smoothness and other resonant cavity requirements; that eliminates walk-off of electromagnetic energy; and that supports resonance at a continuous range of wavelengths. There exists a further need for various systems employing the unique resonant cavities.

SUMMARY OF THE INVENTION

The need in the art is addressed by the resonant cavity of the present invention. In illustrative embodiments, the unique resonant cavity is adapted for use in tunable filter arrays, lens-less imaging systems, enhanced photodetectors, and multispectral imaging systems. The resonant cavity includes a first surface and a second surface, which are partially transmissive and partially reflective. One or more substantially reflective sidewalls are positioned between the first surface and the second surface.

In a specific embodiment, the first surface and the second surface are substantially parallel. The first surface and second surface are input and output surfaces, respectively, of the resonant cavity, which is a contained resonant cavity. The one or more sidewalls are approximately perpendicular to the first surface and the second surface. The one or more sidewalls include a first sidewall and a second sidewall having a first substantially reflective planar surface and a second substantially reflective planar surface, respectively. The first substantially reflective planar surface faces the second substantially reflective planar surface.

In a more specific embodiment, the one or more sidewalls further include a third sidewall and a fourth sidewall having a fourth substantially reflective planar surface and a fifth substantially reflective planar surface, respectively. The fourth substantially reflective planar surface faces the fifth substantially reflective planar surface.

In one illustrative embodiment, the one or more sidewalls are arranged perpendicularly between the first surface and the second surface to form an array of contained resonant cavities therebetween. A first mechanism selectively orients the array of contained resonant cavities relative to input electromagnetic energy, thereby implementing a controllable filter array for filtering the input electromagnetic energy. In another illustrative embodiment, the array of contained resonant cavities is incorporated with a multispectral imaging system that further includes a focal plane array of detectors. The focal plane array is positioned adjacent to the filter array so that each detector of the focal plane array is adjacent to a corresponding contained resonant cavity in the array of contained resonant cavities. In this embodiment, a controller issues control signals to the first mechanism to selectively orient the filter array at predetermined times in accordance with a multispectral imaging algorithm running on the controller. An image processing system electrically communicates with the focal plane array and the imaging algorithm running on the controller.

In yet another illustrative embodiment, the array of contained resonant cavities is incorporated within a lens-less imaging system that further includes a bandpass filter positioned between incoming electromagnetic energy and input surfaces of the array of contained resonant cavities. A focal plane array of detectors is positioned adjacent to output surfaces of the array of contained resonant cavities.

In an alternative embodiment, one or more sidewalls of the one or more contained resonant cavities include a cylindrical sidewall extending perpendicularly between the first surface and the second surface, the cylindrical sidewall has a substantially reflective inner cylindrical surface.

The novel design of one embodiment of the present invention is facilitated by the substantially reflective sidewalls extending between the partially reflective and transmissive input and output surfaces, thereby forming a unique contained cavity adapted to resonate electromagnetic energy. The sidewalls prevent walk off of electromagnetic energy within the cavity, thereby facilitating various applications including optical filter arrays, multispectral imaging systems, lens-less imaging systems, resonant-cavity-enhanced photodiodes, and tunable lasers. Use of the reflective sidewalls further reduces reflectivity, smoothness, and parallelism requirements for the input and output surfaces of the contained resonant cavities.

DESCRIPTION OF THE INVENTION

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

The following review of a conventional Fabry-Perot resonant cavity is intended to facilitate an understanding of the present invention.

Figure 1:
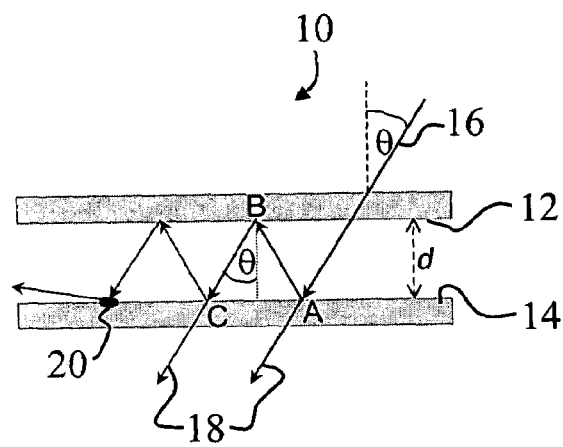
FIG. 1 is a diagram illustrating the walk-off effect in a conventional Fabry-Perot resonant cavity.

FIG. 1 is a diagram illustrating the walk-off effect in a conventional Fabry-Perot resonant cavity 10. The resonant cavity 10 is formed between a first mirror 12 and a second mirror 14, which are partially reflective and partially transmissive and which are substantially parallel. The first mirror 12 provides an input surface for incident electromagnetic energy 16, while the second mirror 14 provides an output surface for output electromagnetic energy 18. The incident electromagnetic energy 16 exhibits an angle of incidence of θ relative to the first input surface 12. Electromagnetic energy input through the first mirror 12 resonates as it bounces back and fourth between the first, mirror 12 and the second mirror, before exiting the second mirror 14.

At each reflection, a fraction of the photons of the electromagnetic energy 16 within the resonant cavity 10 is transmitted. For the purposes of the present discussion, the electromagnetic energy 16, 18 is light. With light 16 incident at an angle θ, the path difference between two successively emergent rays 18 is given by $$AB+BC=2nd\cdot\cos(\theta), \quad [1]$$

where n is the refractive index of the material within the cavity 10; d is the distance between the two parallel mirrors 12, 14, and θ is the angle of incidence as described above.

Finally, the emergent photons interfere constructively if they have the same phase, a condition met when $$2nd\cdot\cos(\theta)=k\lambda, \quad [2]$$

where k is an integer, and λ is the wavelength of the electromagnetic energy 16, 18. Thus, by changing θ, the transmission wavelength (λ) can be adjusted over a broad range. For example, if θ is changed from 0 to 60°, the transmission wavelength changes from λ to λ/2. Unfortunately, tilting the resonant cavity 10 causes the electromagnetic energy to traverse sideways within the resonant cavity 10 until it exits the cavity 10, resulting in potentially prohibitive power loss. Furthermore, any mirror misalignments or impurities, such as the impurity 20, may exacerbate the walk-off effect or otherwise contribute to losses within the resonant cavity 10.

Attempts have been made to use the Fabry-Perot etalon device 10 as a tunable optical filter. As mentioned above, changing nd·cos(θ) changes the transmission maximum of the resonant cavity 10 to the desired value, thereby selectively filtering out narrow wavelength ranges from the incident broadband light 16.

Unfortunately, attempts to employ the resonant cavity 10 have been beset with several difficulties. Changing θ is often not feasible beyond a certain value that decreases with increasing mirror reflectivity. The light progressively walks-off the Fabry-Perot cavity with each reflection.

Other attempts to employ the resonant cavity 10 as a tunable optical filter include changing the refractive index (n) of the material in the cavity 10, or changing the distance (d) between the two mirrors 12, 14. Unfortunately, methods for changing the refractive index (n) offer extremely limited tuning ranges. Methods for controlling the separation distance (d) also offer limited tuning ranges, typically less than 100 nanometers and further require expensive and elaborate feedback control mechanisms and actuators to maintain sufficient mirror parallelism.

As illustrated in FIG. 1, this walk-off phenomenon can be very pronounced in Fabry-Perot etalon devices, such as the device 10. The walk-off effect increases with the minor reflectivity. Consequently, Fabry-Perot etalon devices are difficult to fabricate. Minors with very smooth finishes with high degrees of parallelism arc typically required to produce so-called high finesse Fabry-Perot devices having transmission profiles wit very narrow peaks. Furthermore, the mirrors 12, 14 must exhibit high reflectivity and low absorption coefficients. Failure to conform to these requirements results in a significant walk-off phenomenon, resulting in relatively broad transmission peaks and significantly decreased peak height.

With reference to equation (2), note that if the phase angles of light beams in the resonant cavity 10 differ by an integral number of wavelengths, then the beams add constructively to create a transmission maximum and to thereby establish the resonance phenomenon. As is known in the art, the transmission profile of a lossless cavity wherein the absorption coefficient of the mirrors 12, 14 is zero, and the mirrors 12, 14 are perfectly parallel, is given by $$T_\lambda = \frac{1}{1 + F \cdot \sin^2 \frac{2\pi n d \cdot \cos(\theta)}{\lambda}}, \quad [3]$$

where $T_\lambda$ is the transmission profile; F is the finesse of the cavity 10, which is number related to the reflectivity of the mirrors 12, 14 that determines the shape of the transmission peaks. Higher reflectivity results in a higher F, which results in narrower transmission peaks. The remaining variables are as described above.

Figure 2:
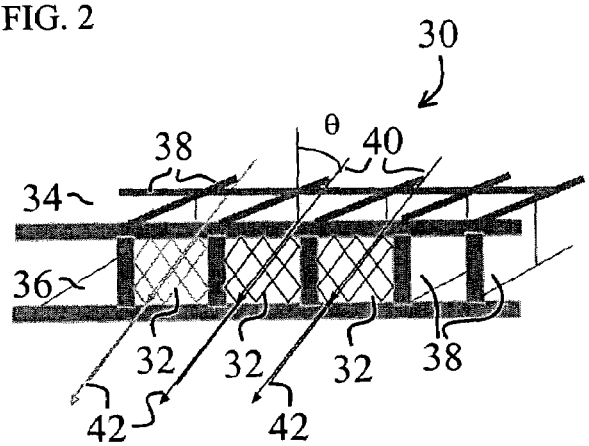
FIG. 2 is a perspective view showing a vertical cross section of an array of contained resonant cavities according to an embodiment of the present invention.

FIG. 2 is a perspective view showing a vertical cross section of an array 30 of contained resonant cavities 32 according to an embodiment of the present invention. The contained resonant cavities 32 are formed between a first surface 34 and a second surface 36, which is approximately parallel to the first surface. The first surface 34 and the second surface 36 are partially reflective and partially transmissive, and they may be implemented via partially silvered mirrors, such as the mirrors 12, 14 of FIG. 1. The first surface 34 represents an input surface for receiving incident electromagnetic energy 40 into the cavities 32. The second surface 35 represents an output surface through which electromagnetic energy, such as output light beams 42, exits.

The contained resonant cavities 32 are contained via sidewalls 38, which are substantially reflective. In the present specific embodiment, the sidewalls are approximately perpendicular to the first surface 34 and the second surface 36 and extend therebetween. The sidewalls 38 may be implemented by depositing a reflective coating on substrate material as discussed more fully below.

As illustrated in FIG. 2, the incident electromagnetic energy 40, which is light in the present embodiment, enters the contained resonant cavities 32 and reflects between the first surface 34, the second surface 36, and the sidewalls 38 before exiting through the second surface 36. Note that the reflective sidewalls 38 prevent undesirable walk off of light from the cavities 32. Hence, the cavities 32 are said to be contained in that they provide closed-volume elements wherein injected photons are always contained within the confines of the cavities 32. The only exit mechanism is absorption within the mirrors 34, 36, 38 or transmission through the partially reflecting mirrors 34, 36.

In the contained-resonant-cavity embodiments disclosed herein, such as the array 30 of FIG. 2, the sidewalls 38 are approximately perpendicular to the flat parallel partially reflective surfaces 34, 36. The contained resonant cavities 32 are similar to a Fabry-Perot etalon device of FIG. 1 with the exception of the mirrored sidewalls 38. In the present specific embodiment, the reflectivity of the sidewall mirrors 38 is much higher than that of the top mirror 34 and bottom mirror 36. Photons injected into the cavities 32 reflect back and forth in the cavities 32. At each reflection, a fraction of light is transmitted. This transmitted fraction of light is a function of the transmission coefficient of the mirrors 34, 36, 38.

To limit the amount of light, i.e., the number of photons, transmitted during a reflection at a sidewall 38, the sidewalls are constructed with much higher reflectivity materials than the first top surface 34 and the second bottom surface 36. If the transmitted photons have identical phases, then they add constructively, resulting in a transmission maximum. Thus, a transmission maximum is created when the optical path difference between two successively emergent rays corresponds to an integral number of wavelengths.

Tilting the array 30 with respect to the incident light 40 reduces the path difference between two successively emergent rays, thereby shifting the transmission maximum to lower wavelengths.

The contained resonant cavities 32 mitigate stringent parallelism and surface finish requirements, since failure to conform to such stringent requirements does not significantly decrease total transmitted power barring absorption losses. Failure to conform to such stringent requirements may merely result in the broadening of the transmission peaks from the contained resonant cavities 32.

Virtually all light injected into the contained resonant cavities 32 through the top mirror 34 must exit at the bottom mirror 36, where it is collected by an appropriate lens or other optical element, such as a focal plane array of detectors, as discussed more fully below. Furthermore, increasing the reflectivity of the mirrors 34, 36, 38 can compensate for the broadening of the transmission peaks.

Since surface finish and parallelism requirements on the mirrors 34, 36, 38 are less exacting, they can now be fabricated with less expensive processes, which significantly lowers device cost. In addition, the increased tolerance to manufacturing errors and ability to use a wider assortment of manufacturing processes enhances the functionality and applicability of the contained resonant cavities 32.

The array 30 of contained resonant cavities may be employed as a filter for filtering various wavelengths of electromagnetic energy, such as light, without prohibitive walk-off effects. Spectral characteristics of the output electromagnetic energy 42 may be adjusted by selectively angling the array 30 relative to incident energy 40. Hence, the frequency response of the array 30 is tuned merely by selectively adjusting the angle of incidence θ by tilting the array 30 relative to the incident energy 40 or by angling the incident energy 40 relative to the top mirror 34 of the array 30.

Tanner Research, Inc., has fabricated arrays of contained resonant cavities in the visible, near-infrared (IR), mid-IR and long-IR ranges, and can also easily fabricate devices in the ultraviolet (UV) range. Various contained resonant cavities may be purchased from Tanner Research, Inc.

Figure 3:
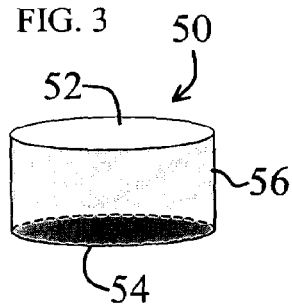
FIG. 3 is a diagram of a cylindrical contained resonant cavity according to an alternative embodiment of the present invention.

FIG. 3 is a diagram of a cylindrical contained resonant cavity 50 according to an alternative embodiment of the present invention. The contained resonant cavity 50 includes a circular top mirror 52 and a circular bottom mirror 54, which are parallel and partially reflective and partially transmissive. A cylindrical sidewall 56 extends perpendicularly between the circular top mirror 52 and a circular bottom mirror 54, forming a contained resonant cavity therebetween. The operation of the contained resonant cavity 50 is similar to the operation of one of the contained resonant cavities 32 of FIG. 3.

Figure 4:
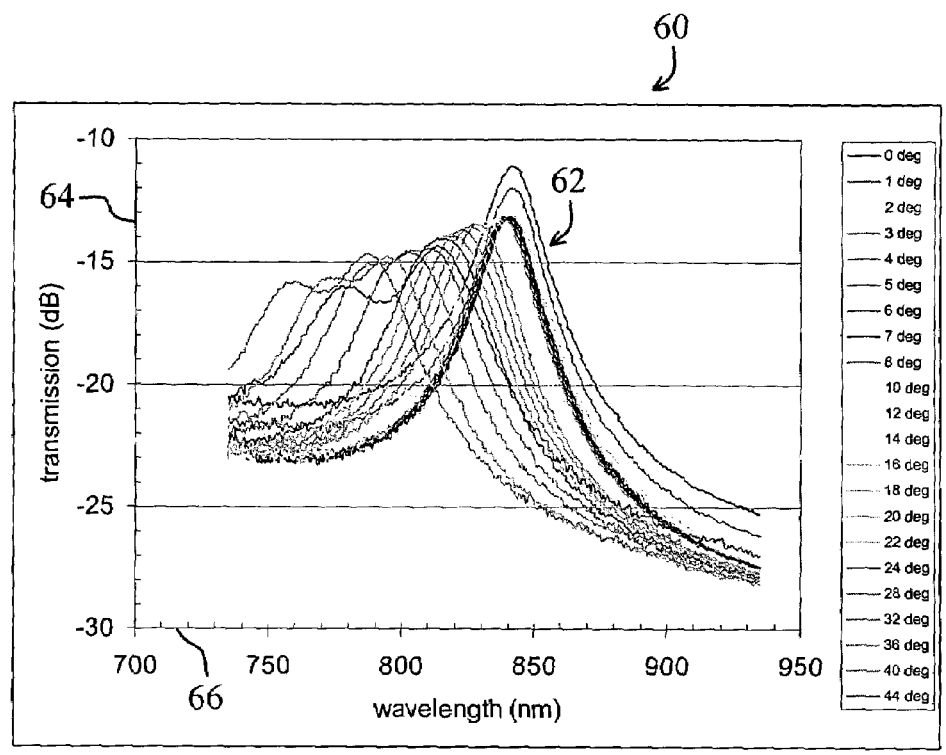
FIG. 4 is a graph illustrating exemplary transmission profiles for one of the contained resonant cavities of FIG. 2 for various tilt angles.

FIG. 4 is a graph 60 illustrating exemplary transmission profiles 62 in Decibels (dB) 64 versus wavelength 66 for one of the contained resonant cavities 32 of FIG. 2 for various tilt angles, i.e., angles of incidence (θ) of incident electromagnetic energy 40 of FIG. 2. With reference to FIGS. 2 and 4, the transmission profiles 62 depict the shifting of the transmission peaks to lower wavelengths as the cavities 32 are tilted with respect to the incident light 40. Hence, the transmission-profile graph 60 illustrates that tuning of the contained resonant cavities can be achieved by tilting the whole array 30 with respect to incident light 40.

The transmission peak wavelength for a particular tilt angle is given by equation (2). Thus, for an initial transmission maximum of 12 μm, the device can be tuned to 6 μm. This tuning range is significantly more than that afforded by any tunable Fabry-Perot etalon device. Even for devices in the visible range, with an initial transmission peak at 650 nanometers, the contained resonant cavities 32 can be tuned to 325 nanometers with a 60° tilt. This tuning range of 325 nanometers is still significantly more than that afforded by single Fabry-Perot etalon devices. The tuning described previously can be achieved with minimum, or even no feedback control, as no sub-nanometer scale accuracy in motion is required.

Figure 5:
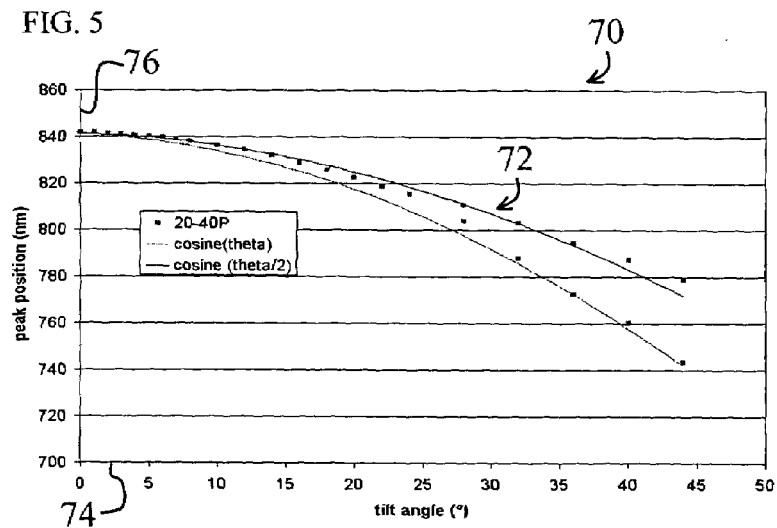
FIG. 5 is a graph illustrating peak transmission wavelength versus tilt angle for one of the resonant cavities of FIG. 2.

FIG. 5 is a graph 70 illustrating peak transmission wavelengths 72 as a function of tilt angle 74 for one of the contained resonant cavities 32 of FIG. 2. The peak wavelength curves 72 are plotted as wavelength 76 versus tilt angle 74 for exemplary input electromagnetic energy.

Figure 6:
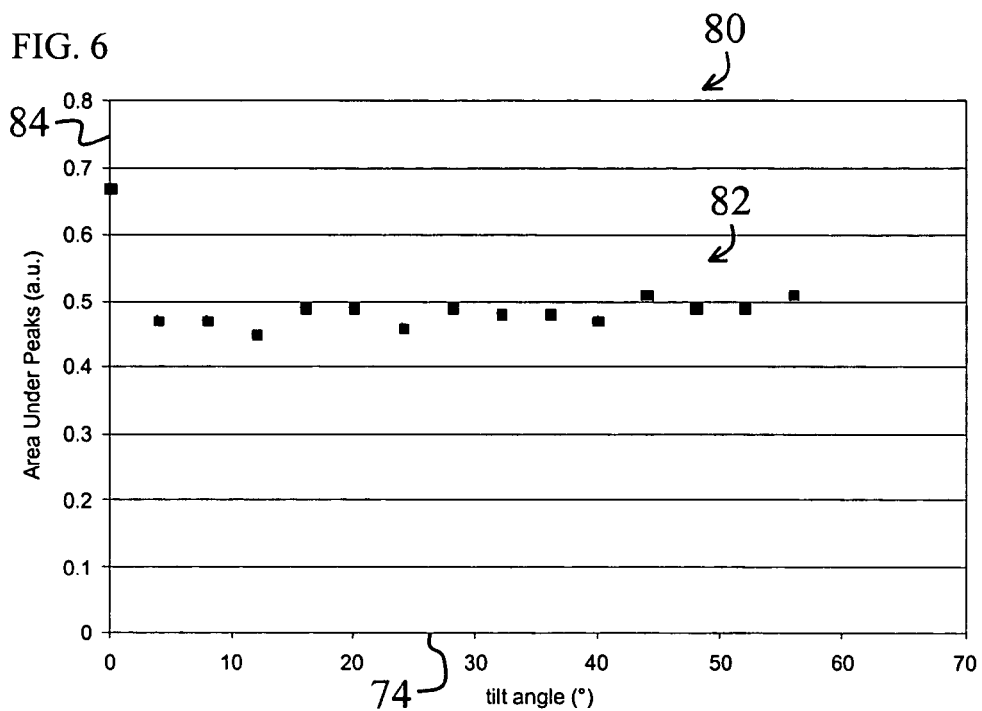
FIG. 6 is a graph illustrating integrated light power versus tilt angle for one of the contained resonant cavities of FIG. 2.

FIG. 6 is a graph 80 illustrating integrated light power values 82 as a function of tilt angle for one of the contained resonant cavities 32 of FIG. 2. The power values 82 are plotted as power 84 versus tilt angle 74. The power corresponds to the area under the peaks of corresponding transmission profiles (see equation (3)), which is also called the integrated light power. Note that the integrated light power transmitted remains relatively constant, barring a sharp decrease around 0°, even as the contained resonant cavities 32 of FIG. 2 are tilted over a wide range. Hence, the contained resonant cavities 32 of FIG. 2 prevent significant power loss that would otherwise occur with conventional Fabry-Perot devices.

Figure 7:
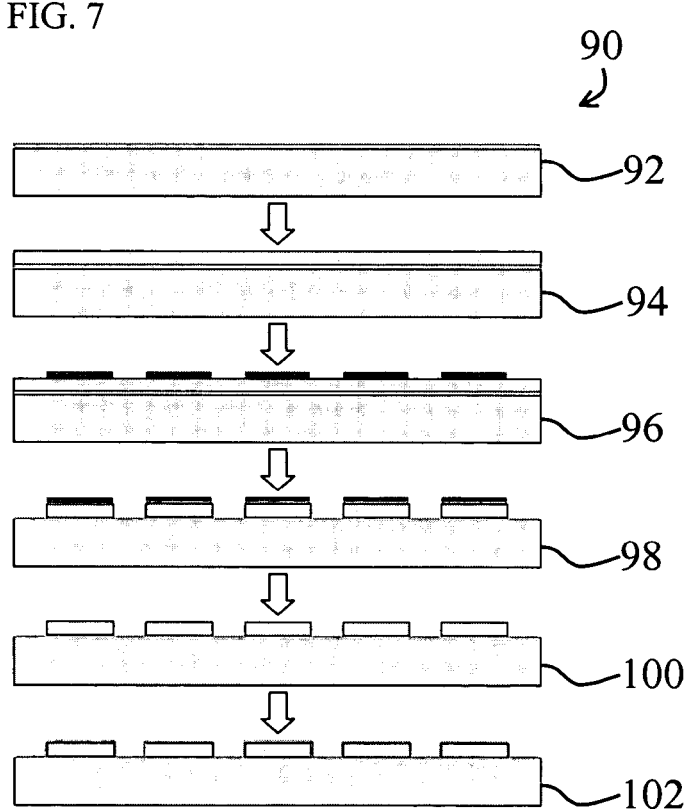
FIG. 7 is a flow diagram illustrating various stages in a manufacturing process for manufacturing the array of contained resonant cavities of FIG. 2.

FIG. 7 is a flow diagram illustrating various stages 90 in a manufacturing process for manufacturing the array 30 of contained resonant cavities of FIG. 2. In a first step 92, a partially reflective layer is deposited on a substrate. In a second step 94, additional substrate material that will form support for cavity sidewalls is deposited on the partially reflectively layer. In a third step 96, the additional substrate material is patterned via photo resist. The additional substrate material is then etched in accordance with the pattern in a subsequent fourth step 98. In a fifth step 100, the photoresist employed in the third step 96 and the fourth step 98 is removed. In a sixth step 102, additional reflective material is deposited in the resulting cavities, resulting in reflective indentations. Subsequently, another reflective layer may be installed atop the resulting structure, thereby forming optical rectangular waveguides. The open sides of the resulting waveguides may be capped via sheets of partially reflective material.

Those skilled in the art will appreciate that various different manufacturing processes may be employed to construct the contained resonant cavity array 30 of FIG. 2 without departing from the scope of the present invention. For example, one may deposit a thick layer of reflective metal, etch it down to form cylindrical, rectangular, or square cross sections, and then cap the resulting structure with another layer of reflective metal. Several variations around this alternate fabrication scheme can also be adopted.

Figure 8:
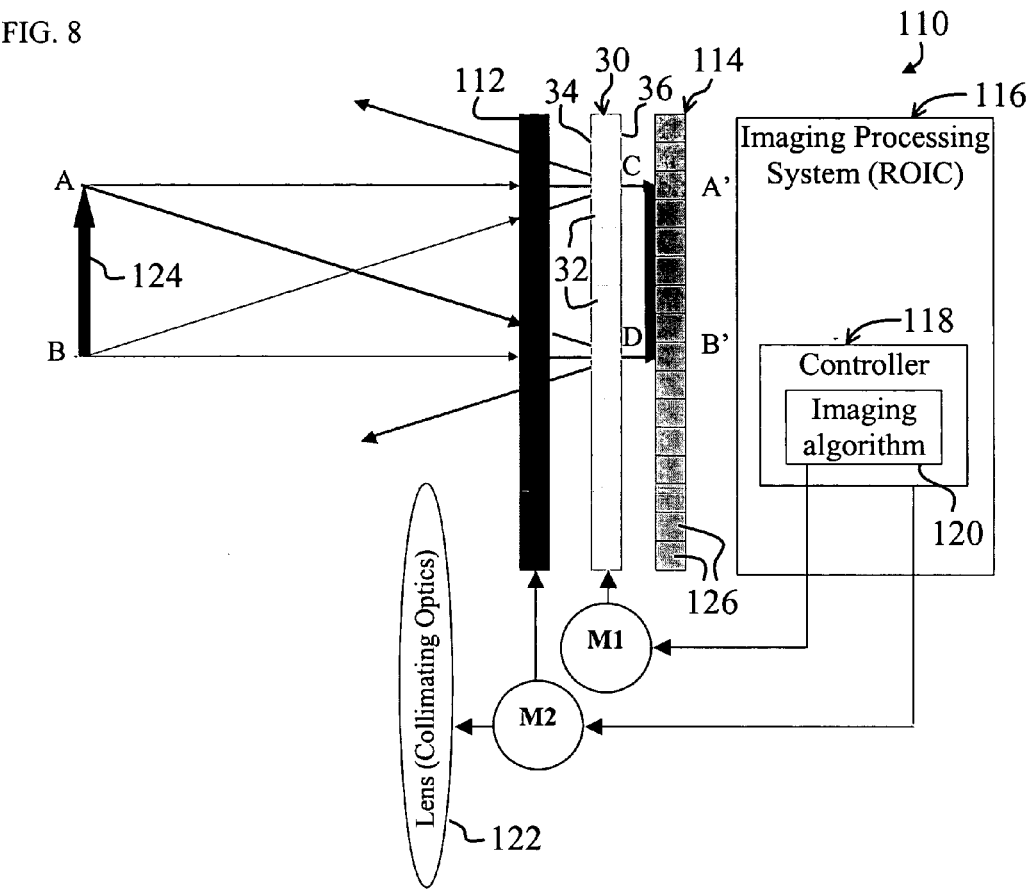
FIG. 8 is a diagram illustrating a hybrid lens-less imaging system and multispectral imaging system according to an illustrative embodiment of the present invention.

FIG. 8 is a diagram illustrating a hybrid lens-less imaging system and multispectral imaging system 110 according to an illustrative embodiment of the present invention. The imaging system 110 exhibits two modes of operation, including a lens-less mode and a multispectral mode of operation.

In the lens-less mode, the imaging system 110 includes a bandpass filter 112 that is positioned adjacent to an input surface 34 of the contained-resonant-cavity array 30. A focal plane array of detectors 114 is positioned adjacent to the output surface 36 of the contained-resonant-cavity array 30 and is oriented to receive light output from the output surface of the contained-resonant-cavity array 30. An image processing system 116 implemented on a Read-Out Integrated Circuit (ROIC) is in electrical communication with the focal plane array 114. The imaging processing system 116 accommodates a controller 118 running an imaging algorithm 120.

The controller 118 provides control input to a first motor (M1) that is configured to selectively angle the contained-resonant-cavity array 30 at predetermined times in response thereto during the multispectral mode of operation. The imaging algorithm 120 running on the controller 118 determines the optimal control signals to send to the motor M1 to orient the array 30 in response to input from the focal plane array 114 and in accordance with a given application.

The controller 118 provides control signals to a second motor (M2) that is configured to selectively swap the filter 112 with a lens 122 or other collimating optics to switch between the lens-less and the multispectral modes of operation in response to appropriate control signals from the controller 118.

In operation, during the first lens-less mode of operation, light or other electromagnetic energy reflecting from an object passes through the filter 112, which removes predetermined wavelengths from the incident energy and passed a desired frequency band of energy to the input surface 34 of the contained-resonant-cavity array 30. In this mode of operation, the contained-resonant-cavity array 30 is oriented so that filtered electromagnetic energy output from the filter 112 passes approximately perpendicularly through the input surface 34.

In the present specific embodiment, the filter 112 is preferably implemented via an electro-optic filter, wherein the frequency response of the filter may be adjusted in response to control signals from the controller 118. Use of such an electrically controllable filter 112 may facilitate obtaining multispectral or hyperspectral information about the object 124. In this embodiment, the focal plane array 114 exhibits advanced photodetectors 126 with relatively high signal-to-noise ratios.

Light impinging on a particular cavity 32 with an angle of incidence greater than a certain cutoff angle will reflect from the input surface 34. Hence, each contained resonant cavity 32 which is aligned with and corresponds to each pixel in the focal plane array 114 will only receive light within a predetermined acceptance cone as discussed more fully below. The dimensions of each acceptance cone may be tailored by adjusting the reflectivity and dimensions of the input surfaces 34 of each contained resonant cavity 32.

The resonant cavities 32 resonate filtered electromagnetic energy and then output collimated energy in response thereto to corresponding pixels 126 of the focal plane array 114, thereby obviating the need for a collimating lens or other collimating optics. Accordingly, large lenses, which may be undesirably heavy and may require large spacing to accommodate lengthy focal lengths, may be omitted. Consequently, great space and weight savings may be achieved by using the system 110 as a lens-less system without the lens 122 and accompanying motors M1, M2. In fact, the filter 112, contained-resonant-cavity array 30, focal plane array 114, and imaging processing system 116 may be implemented within a 1 millimeter thick space using conventional manufacturing techniques. Such compact imaging systems are particularly advantageous in applications where space and weight considerations are important, such as miniature unmanned aerial vehicle applications.

However, in applications wherein multispectral imagery is required, the imaging system 110 is operated in a multispectral mode of operation, wherein the filter 112 is omitted, such as via the second motor M2, and the collimating lens 112 is positioned to focus collimated light onto the contained-resonant-cavity array 30. In this mode, the imaging algorithm 120 running on the controller 118 issues control signals to the first motor M1 to selectively tilt the contained-resonant-cavity array 30. As the contained-resonant-cavity array 30 is tilted, different frequencies of energy reflecting or emanating from the object 124 are detected by the focal plane array 114. Accordingly, composite imagery containing images of the object 124 at different frequencies may be constructed via the image processing system 116. This enables the image processing system 116 to obtain additional multispectral or hyperspectral image information about the object 124.

The filter 112, which is a narrowband bandpass filter in the present embodiment, the focal plane array 114, motors M1, M2, and the lens 122 may be implemented via well known readily available components. Those skilled in the art with access to the present teachings may readily develop the controller 112, imaging algorithm 120, and overall image processing system 116 without departing from the scope of the present invention.

During the multispectral mode of operation, the contained-resonant-cavity array 30 acts as a tunable filter array in that tilting the entire array 30 with respect to incident light via the first motor M1, or tilting the ray 30 on a per-cavity basis, provides a tuning of the transmission maximum over a wide wavelength range. Furthermore, tilting of the contained-resonant-cavity array 30 does not require any high precision motion. Finally, the walk-off phenomenon, which is the bane of the Fabry-Perot cavity, is eliminated by the sidewall mirrors 38 of FIG. 2, thereby ensuring maximum light throughput. The sidewall mirrors 38 of FIG. 2 serve to contain the light in a physical space with virtually no loss in resolution.

The imaging algorithm 120 may employ an open-loop control algorithm to control the tilt angle of the contained-resonant-cavity array 30 via the first motor M1. Complex or expensive closed-loop controllers are not required. However, closed-loop controllers may be employed without departing from the scope of the present invention.

Previously, viable solutions for obtaining hyperspectral information on an object image using a planar solution did not exist. Several attempts have been made to obtain multispectral and hyperspectral information from an object image. These attempts range from (a) the use of a pushbroom type of system which acquires data in 2 dimensions: 1 in space, and 1 in wavelength (using a wavelength dispersive element; the $2^{nd}$ spatial dimension is scanned over time). (b) use of an array of fixed wavelength bandpass filters on the front end of a detector array; the filters selectively transmit a narrow wavelength range to the corresponding detector element. With an interdigitated set of filter arrays, multispectral information on the target image can be built up. (c) the use of tunable filter arrays superimposed on a photodetector array, wherein each pixel in the array is scanned over a range of wavelengths. Unfortunately, these attempts have been beset with various performance limitations, and with fabrication difficulties.

In conventional imaging systems, use of a lens is necessitated by the fact that photodetector arrays typically measure the number of impinging photons (in the proper wavelength range) and not their direction. Thus, if a photodetector array could be provided directional sensitivity, a lens-less imaging system would be enabled. As illustrated in FIG. 8, an array 30 of contained resonant cavities 32, when combined with a fixed bandpass filter 112, enables such a lens-less imaging system 110.

Several embodiments around the basic lens-less imaging system 110 depicted in FIG. 8 can be constructed following the general principles outlined here. Tuning the low cutoff wavelength of the bandpass filter 112, such as by using an electroabsorptive material, will tune the acceptance cones of the detector elements 126.

While a tradeoff exists between image brightness and resolution, a rapid tuning operation, combined with a deconvolution algorithm, results in simultaneous imaging of objects at near and far distances. Thus electrical tuning of the electroabsorptive material of the filter 112 can be performed at high speeds, enabling rapid data collection for a range of target distances.

Figure 9:
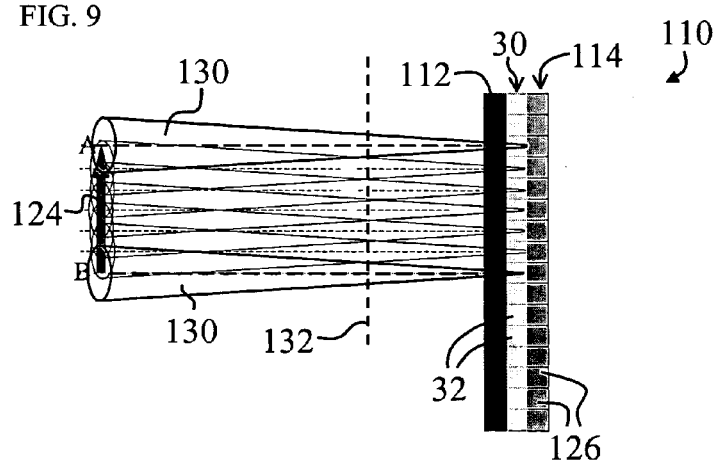
FIG. 9 is a diagram of the hybrid imaging system of FIG. 8 in a lens-less configuration illustrating acceptance cones corresponding to each pixel.
Figure 10:
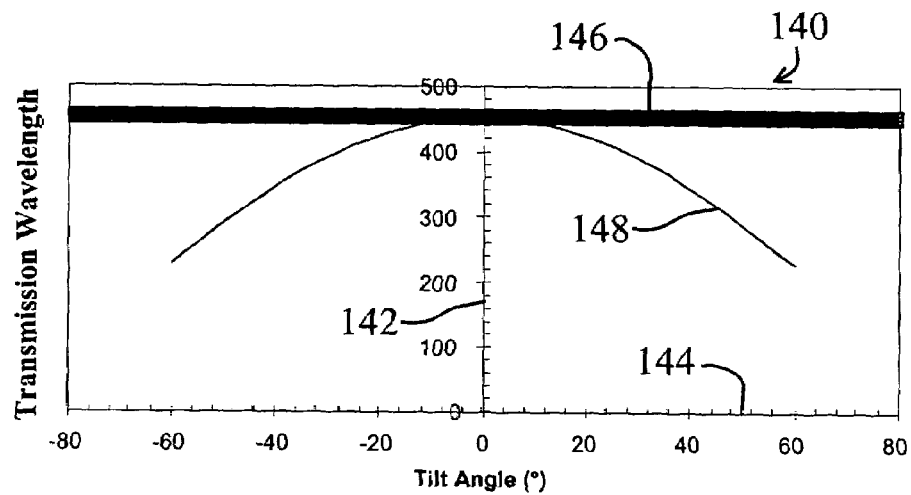
FIG. 10 is a graph illustrating transmission wavelength versus tilt angle of the array of contained resonant cavities for the imaging system of FIG. 9.

FIG. 9 is a diagram of the hybrid imaging system 110 of FIG. 8 in a lens-less configuration illustrating acceptance cones corresponding to each Local plane array pixel 126. For clarity, various modules and components have been omitted from the imaging system 110 of FIG. 9. With reference to FIGS. 8–10, the width of the bandpass filter 112 of FIGS. 8 and 9, and the transmission profiles of the contained resonant cavities 32 combine to create acceptance cones 130 for each detector element 126. Light outside of the acceptance cone for a particular contained resonant cavity 32 is blocked from the corresponding detector element 126. Light within the acceptance cones 130 impinges on the corresponding detector pixel 126. The angles of the acceptance cones 130 are determined by the tilt angle at which the transmission wavelength of the contained resonant cavities 32 equals the low cutoff wavelength of the bandpass filter 112. The acceptance cones 130 merge at a plane 132 at which objects are imaged at the proper resolution. Objects further out than the plane 132 are blurred, and will require a deblurring algorithm. Alternatively, the low wavelength cutoff of the bandpass filter 112 can be varied if an electroabsorptive filter is used. Using an such an electrically tunable filter 112 to rapidly scan the field of view for close and far object 124, which are separately imaged at proper resolution may be employed to facilitate image construction.

FIG. 10 is a graph 140 illustrating transmission wavelength versus tilt angle of the array 30 of contained resonant cavities for the imaging system 110 of FIGS. 8 and 9. With reference to FIGS. 8–10, filter transmission wavelengths 146 of the narrow bandpass filter 112 of FIGS. 8 and 9, and cavity transmission wavelengths 148 of the contained resonant cavities 32 with respect to the tilt angle of incident light is graphed.

The contained resonant cavities 32 are designed such that the transmission wavelengths of the bandpass filter 112 correspond to the transmission wavelengths of the contained resonant cavities 32 at normal incidence. In the idealized device, a narrow (near monochromatic) wavelength is transmitted by the bandpass filter 112, and this wavelength corresponds to the transmission peaks of the contained resonant cavities at normal incidence.

Nearly monochromatic bandpass filters do not exist, of course. Accordingly, a range of wavelengths defined by the bandpass filter 112 originating or reflecting from all sections of the object 124 will be incident on the contained resonant cavities 32. Whether or not these rays are transmitted by the contained resonant cavities 32 depends on their angle of incidence. Angles of incidence for which light will be transmitted for a particular cavity 32 is determined by the corresponding acceptance cone 130. The angle of this acceptance cone is determined by angle of incidence (θ) at the point where the contained resonant cavity peak transmission wavelength 148 corresponds to the low-end wavelength cutoff (see 146) of the bandpass filter 112, which is corresponds to an angle of incidence (θ) of approximately 12 degrees.

Figure 11:
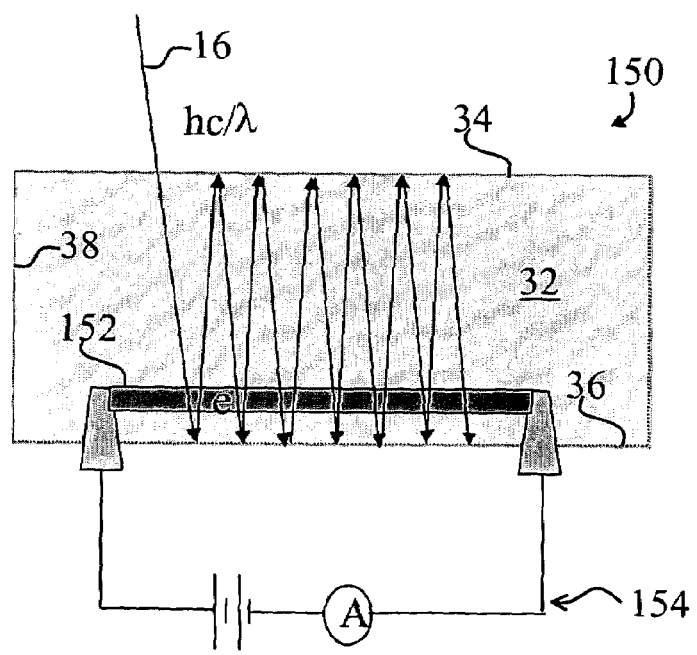
FIG. 11 is a diagram of a contained-resonant-cavity-enhanced photodetector according to a second illustrative embodiment of the present invention

FIG. 11 is a diagram of a Contained-Resonant-Cavity-Enhanced (CRCE) photodetector 150 according to a second illustrative embodiment of the present invention. The CRCE photodetector 150 includes a contained resonant cavity 32 with a p-i-n photodetector 152 disposed therein. Input light 16 bounces within the cavity 32 multiple times and is therefore exposed to the thin layer of photodetector 152 material multiple times. The required thickness of the photodetector 152 to produce a given current in an accompanying circuit 154 decreases by a factor proportional to the average number of bounces within the cavity 132. The circuit 154 is initially configured to place the photodetector 152 in reverse-bias mode as discussed more fully below.

The CRCE photodiode 150 offer is a high-bandwidth and high-efficiency detector. Until the advent of the contained resonant cavities disclosed herein, attempts to construct resonant cavity enhanced photodetectors were plagued by the previously discussed walk-off phenomenon.

Figure 12:
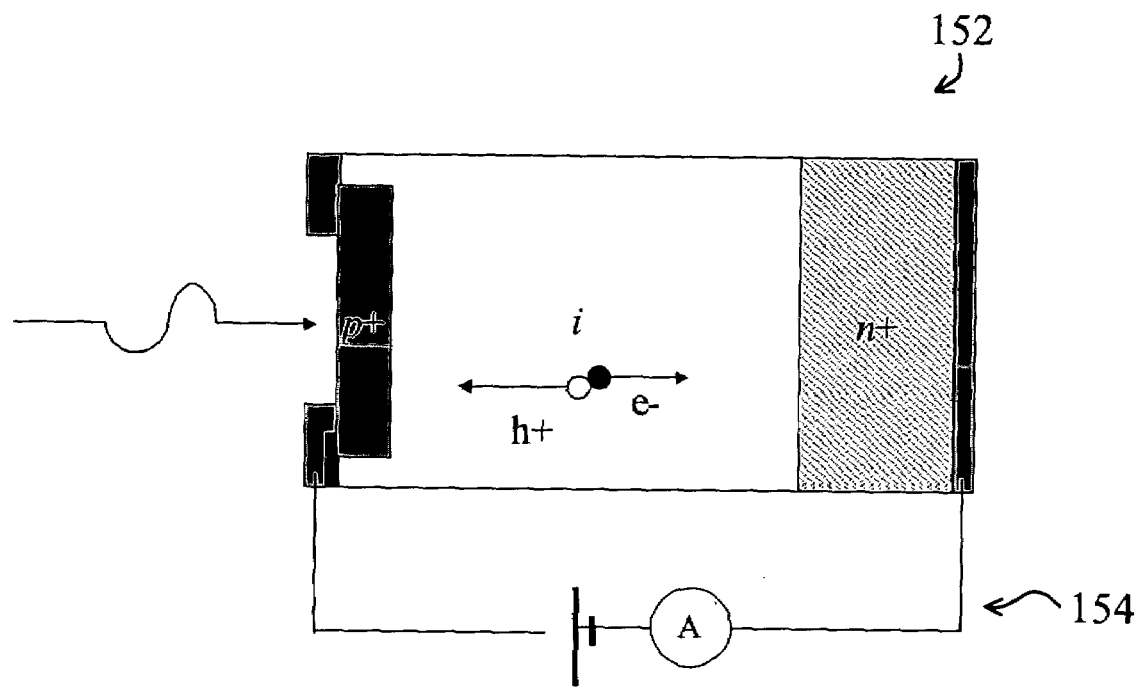
FIG. 12 is a more detailed diagram illustrating an exemplary p-i-n photodetector suitable for use with the contained resonant cavity of FIG. 11.

FIG. 12 is a more detailed diagram illustrating an exemplary p-i-n photodetector 152 suitable for use with the contained resonant cavity 32 of FIG. 11. Those skilled in the art will appreciate that other types of photodetectors may be employed without departing from the scope of the present invention. The p-i-n photodetector 152 includes an intrinsic semiconductor layer (i) between a p-type semiconductor layer (p+) and an n-type semiconductor layer (n+), which is reverse biased via the circuit 154.

In operation, photon absorption occurs in a depletion region in the intrinsic layer (i). Photons of the appropriate wavelength are absorbed in the intrinsic layer (i), and create and electron-hole pair (h+, e–) by ejecting an electron from the valence band into the conduction band of the intrinsic semiconductor material.

The photodiode 152 is maintained at a reverse bias potential via the circuit 154, which together with the built-in potential, maintains a steady field in the intrinsic layer (i). This field causes the electron-hole pair to drift to the appropriate p/n layers (holes to the p-layer, electrons to the n-layer). During the migration of the electron-hole pair, electrons from the external battery of the circuit 154 flow toward the p-layer, thereby establishing a current in the circuit 154, which is measured as being proportional to the number of impinging photons in the intrinsic layer (i).

The presence of thermally induced electron-hole pairs in the intrinsic layer (i) interferes with the measurement of the photo-induced electron-hole pairs. Hence, the total current measured in the circuit 154 is the sum of the currents due to the two types of electron-hole pairs. The thermally induced electron-hole pairs result in a so-called dark current, which is proportional to the number of thermally induced electron-hole pairs.

Of more significance is the fluctuation in the steady state current. This variation is caused by the statistical nature of electron-hole pair creation within the intrinsic layer (i). Both thermal and photogenerated electron-hole pairs are created at a random location within the depletion region of the intrinsic layer (i). Therefore, they arrive at discrete time intervals on the p/n layers, creating a variation around the steady state current. Variation in the dark current due to the statistical nature of electron-hole pair generation is referred to as shot noise, and that due to the statistical nature of photogenerated electron-hole pairs is referred to as shot noise current due to quantum noise.

The two shot noise contributions add up, and can be represented by:

$$i_n = [2e(I_d + I_{ph})B]^{0.5}, \quad [4]$$

where $I_d$ and $I_{ph}$ are the steady currents due to thermal and photogenerated electron-hole pairs, respectively; and B is the detector bandwidth.

It is this noise that limits the signal to noise ratio of the photodetector 152. Another factor that limits the signal to noise ratio is a reduction in the quantum efficiency, which is defined as the number of electrons collected by the photodiode divided by the number of impinging photons, due to recombination of the electron-hole pairs or some other leakage mechanism.

Typically, electron-hole pairs generated further than one diffusion length from the p-i or i-n interfaces will recombine before the reach the n/p layers, thereby creating an additional contribution to shot noise. Further, the electron-hole pairs require a finite time to drift to the n/p layers. This finite drift time ultimately limits the photodetector response time.

Many attempts to obtain photodetectors with higher signal-to-noise ratios have centered around the development of new semiconductor materials with an inherently lower number of thermally generated electron-hole pairs, and cooling the detector material to cryogenic temperatures to further reduce the number of thermally generated electron-hole pairs. Reducing the number of thermally generated electron-hole pairs reduces the dark current, but has a smaller effect on the shot noise (see equation (4)).

With reference to FIGS. 11 and 12, arrays (not shown) of such CRCE photodiodes 150 may fabricated on a wafer, offering numerous other benefits in addition to the high speed and high signal-to-noise ratio. For example, with the photodetector 152, also called a photodiode, in the contained resonant cavity 32, the thickness of the accompanying intrinsic layer (i) can be reduced from between approximately 1–20 micrometers for the case of the p-i-n photodetector 152 to between approximately 50–500 nanometers. This reduces the total thickness of the photodetector to between approximately 200 nanometers –5 micrometers. The exact dimension is determined by the spectral selectivity, as is known in the art.

This reduction in the photodetector thickness opens up new processing routes. In particular, the photodetectors can now be directly deposited onto an ROIC layer instead of being fabricated on a separate substrate. This fabrication approach eliminates the need for bump bonds between the ROIC layer and the photodetector 152. Bump bonding typically limits the resolution of accompanying photodetector arrays. Thus, with CRCE photodiodes constructed in according to the teachings of the present invention, higher resolution photodiode arrays can be fabricated.

In addition to photodiodes, the contained resonant cavities 32 can be used to enhance the signal-to-noise ratio in photoconductors. In photoconductors, the resonant cavity 32 decreases the thickness required for effective photon absorption, thereby decreasing the number of thermally generated electron-hole pairs, and thereby reducing the dark current.

Finally, one additional feature of the CRCE photodetector 150 of FIG. 11 is its spectral selectivity. The absorption profile of the photodetector 150 resembles the shape of the transmission profile of the Fabry-Perot etalon cavity 20 itself, as illustrated in FIG. 8. This feature becomes an added advantage when spectral selectivity is desired. To further improve the performance of the CRCE photodetector 150, the reflectivity of the top partially reflective surface 34 may be enhanced.

Figure 13:
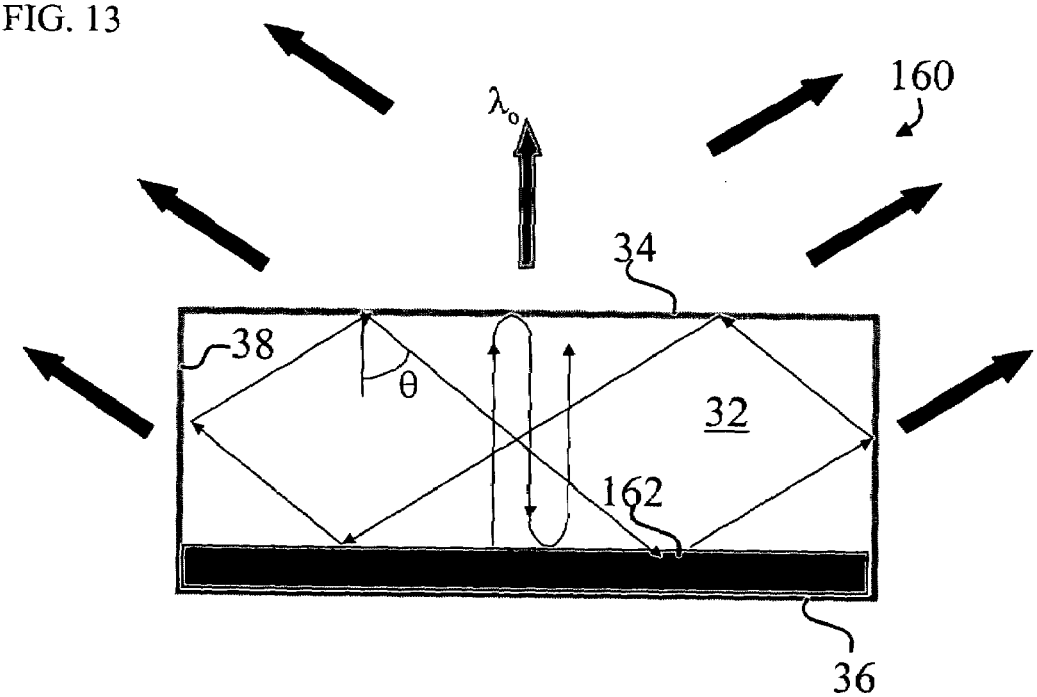
FIG. 13 is diagram of a tunable laser according to a third illustrative embodiment of the present invention.

FIG. 13 is diagram of a tunable laser 160 according to a third illustrative embodiment of the present invention. The tunable laser 160 includes lasing material 162 placed within a contained resonant cavity 32. For clarity, various features, such as power supplies, have been omitted from FIG. 13. However, those skilled in the art with access to the present teachings may implement appropriate features to meet the needs of a given application without undue experimentation.

Those skilled in the art will appreciate that a continuum of lasing wavelengths is supported in the contained resonant cavity 32 unlike in conventional laser cavities. These lasing wavelengths occur at different angles within the resonant cavity 32, as depicted. Thus, if the lenses and/or other collection optics, such as the resonant cavity filter array 30 of FIG. 2 are placed at various tilt angles relative to laser light output by the laser 160, laser light at different desired wavelengths can be collected.

Those skilled in the art will appreciate that electrons are pumped in the lasing material 162, via the injection of optical or electrical power, from a ground state to a higher energy state, thereby creating a population inversion in the lasing material. A population inversion occurs when more electrons exist in the higher energy state. In many lasers, the lasing material exhibits one or more intermediate states between high and low energy states involved in the population inversion.

High-energy electrons in the high energy state are stimulated down to the ground state, i.e., low state, with a radiative decay process when another photon with an energy corresponding to the band gap energy impinges on the lasing 162 material. The phase and wavelength of the emitted photon corresponds to that of the impinging photon. If the lasing material is placed in an appropriate resonant cavity, such as the contained resonant cavity 32, then these two photons are reflected back and subsequently impinge on the lasing material 162 with the same phase, thereby stimulating the emission of two additional photons. This process can be continued until an equilibrium is reached between optical or electrical pumping and stimulated emission.

Conventional lasers are placed in a two-mirror optical cavity, such the Fabry-Perot etalon, which supports resonance at discrete wavelengths only. Therefore, for efficient laser amplification, the bandgap energy of the electrons corresponding to the population inversion state must match a resonant wavelength of the laser cavity. Unfortunately, this precludes the use of a wide range of materials.

In such conventional lasers, stimulated emission may occur at wavelengths not corresponding to a cavity resonance. Thus, for conventional semiconductor lasers, materials wherein photon dissipation time scales are comparable to the stimulated emission time scales become undesirable.

However, for applications employing the tunable laser 160, such a material, when combined with the contained resonant cavity, becomes ideal. The contained resonant cavity 32 supports laser light amplification at virtually all wavelengths. Support of light amplification at different wavelengths occurs at different angles with respect to the normal to the top surface 34.

The present approach building a tunable laser 160, wherein the resonant cavity supports lasing at continuous wavelengths, enables use of a lasing material in which the bandgap energy corresponding to the population inversion is a not discrete number, but rather a continuum.

In a conventional laser, the lasing efficiency would decrease substantially because the accompanying resonant cavity would support only discrete bandgap energies within the continuum. With the use of a contained resonant cavity 32 with such a lasing material 162, the lasing efficiency would actually increase substantially, since the cavity 32 supports lasing at all wavelengths. Finally, the lasing wavelength desired could be easily picked by tilting the laser cavity with respect to a collecting lens, such as the lens 122.

Thus, the present invention has been described herein with reference to a particular embodiment for a particular application. Those having ordinary skill in the art and access to the present teachings will recognize additional modifications, applications, and embodiments within the scope thereof.

It is therefore intended by the appended claims to cover any and all such applications, modifications and embodiments within the scope of the present invention.

Accordingly,

What is claimed is:

1. An efficient resonant cavity comprising:
    a partially transmissive and partially reflective first surface;
    a partially transmissive and partially reflective second surface; and one or more substantially reflective sidewalls positioned between said first surface and said second surface, wherein said first surface and said second surface are substantially parallel; said first surface represents with an input surface of said resonant cavity; said second surface represents an output surface of said contained resonant cavity; said resonant cavity is a contained resonant cavity; said one or more sidewalls are oriented approximately perpendicular to said first surface and said second surface; said one or more sidewalls include a first sidewall and a second sidewall having a first substantially reflective planar surface and a second substantially reflective planar surface, respectively wherein said first substantially reflective planar surface faces said second substantially reflective planar surface; and wherein said one or more sidewalls further include:
        a third sidewall and a fourth sidewall having a third substantially reflective planar surface and a fourth substantially reflective planar surface. respectively, said third substantially reflective planar surface facing said fourth substantially reflective planar surface; and
        plural reflective sidewalls arranged perpendicularly between said first surface and said second surface, thereby forming an array of contained resonant cavities therebetween.

2. The resonant cavity of claim 1 further including first means for selectively orienting said array of resonant cavities relative to input electromagnetic energy, thereby forming a controllable filter array for filtering said input electromagnetic energy.

3. The resonant cavity of claim 2 wherein said array of contained resonant cavities is incorporated with a multispectral imaging system that further includes a focal plane array of detectors positioned adjacent to said filter array so that each detector of said focal plane array of detectors is adjacent to a corresponding one of said contained resonant cavities in said array of contained resonant cavities.

4. The resonant cavity of claim 3 further including a controller in communication with said first means, said controller issuing control signals to said first means to selectively orient said filter ray a predetermined times in accordance with a multispectral imaging algorithm running on said controller.

5. The resonant cavity of claim 4 further including an image processing system in electrical communication with said focal plane array and said imaging algorithm running on said controller.

6. The resonant cavity of claim 1 wherein said array of contained resonant cavities is incorporated within a lens-less imaging system that further includes a filter positioned between a incoming electromagnetic energy and input surfaces of said array of contained resonant cavities.

7. The resonant cavity of claim 6 wherein said filter is a bandpass filter, and wherein said lens-less imaging system further includes a focal plane ray of detectors positioned adjacent to output surfaces of said ray of contained resonant cavities.

8. An imaging system comprising:
a focal plane array of detectors for receiving radiated electromagnetic energy and providing an electrical signal in response thereto and
an array of contained cavities positioned in front of said focal plane array of detectors, each of said contained cavities having partially reflective input and output surfaces and substantially reflective sidewalls, said output surfaces facing said focal plane array of detectors.

9. The system of claim 8 further including means for selectively orienting said array of contained cavities to adjust spectral filtering characteristics of said array of contained cavities, and wherein said contained cavities arc contained resonant cavities.

10. The system of claim 9 further including a motor in communication with said array of contained cavities, said motor responsive to control signals from a controller.

11. The system of claim 8 wherein said imaging system is a multispectral imaging system and further includes a filter adapted to filter input electromagnetic energy and to provide filtered electromagnetic energy in response thereto to said array of contained cavities.

* * * * *